(12) United States Patent
Gehling

(10) Patent No.: US 10,907,682 B2
(45) Date of Patent: Feb. 2, 2021

(54) AUXILIARY ASSEMBLY DEVICE AND METHOD FOR PREMOUNTING A LINEAR GUIDE SYSTEM

(71) Applicant: SKF MOTION TECHNOLOGIES AB, Gothenburg (SE)

(72) Inventor: Bernd Gehling, Werneck (DE)

(73) Assignee: SKF Motion Technologies AB, Goethenburg (SE)

( * ) Notice: Subject to any disclaimer, the term of this patent is extended or adjusted under 35 U.S.C. 154(b) by 0 days.

(21) Appl. No.: 16/573,214

(22) Filed: Sep. 17, 2019

(65) Prior Publication Data
US 2020/0088236 A1 Mar. 19, 2020

(30) Foreign Application Priority Data
Sep. 17, 2018 (DE) .......................... 10 2018 215 772

(51) Int. Cl.
*A47B 96/04* (2006.01)
*F16C 29/06* (2006.01)
*F16C 43/06* (2006.01)

(52) U.S. Cl.
CPC ............ *F16C 29/06* (2013.01); *F16C 43/065* (2013.01)

(58) Field of Classification Search
CPC .... F16C 29/041; F16C 29/043; F16C 29/005; F16C 29/06; F16C 43/065
USPC ....................................................... 312/334.6
See application file for complete search history.

(56) References Cited

U.S. PATENT DOCUMENTS

| | | | | |
|---|---|---|---|---|
| 4,659,237 A * | 4/1987 | Rapp | ..................... | A47B 88/493 384/19 |
| 4,697,935 A * | 10/1987 | Yasui | ..................... | F16C 29/041 384/47 |
| 5,363,741 A * | 11/1994 | Takada | ..................... | B23Q 5/26 92/13.5 |
| 6,659,576 B1 * | 12/2003 | Welch | ..................... | A47B 88/43 312/330.1 |
| 10,307,898 B2 | 6/2019 | Lin | | |
| 2005/0117821 A1* | 6/2005 | Yamazaki | ............. | F16C 29/043 384/51 |
| 2006/0279187 A1* | 12/2006 | Yang | ..................... | A47B 88/423 312/333 |
| 2009/0232426 A1* | 9/2009 | Hammerle | ........... | A47B 88/487 384/18 |

(Continued)

FOREIGN PATENT DOCUMENTS

| | | |
|---|---|---|
| CN | 204533238 U | 8/2015 |
| CN | 105936028 A | 9/2016 |
| DE | 202009013872 U1 | 4/2010 |

*Primary Examiner* — Matthew W Ing
(74) *Attorney, Agent, or Firm* — Laurence A. Greenberg; Werner H. Stemer; Ralph E. Locher

(57) ABSTRACT

An auxiliary assembly device is provided for premounting a linear guide system on a top part. The linear guide system includes two linear guides having two respective mutually displaceable guide rails, which have mutually facing raceways. Rolling elements, which are disposed in a cage, are located between the mutually facing raceways. The auxiliary assembly device has an auxiliary rail, which is configured for connection to a respective narrow end of the two linear guides in order to hold the two linear guides with the top part in a preassembled state for insertion into a bottom part. A method for premounting a linear guide system on a top part is also provided.

8 Claims, 2 Drawing Sheets

(56) References Cited

U.S. PATENT DOCUMENTS

| | | | | |
|---|---|---|---|---|
| 2014/0270601 A1* | 9/2014 | Chen | ............... | F16C 29/043 |
| | | | | 384/15 |
| 2014/0348448 A1* | 11/2014 | Horie | ............... | F16C 29/02 |
| | | | | 384/43 |
| 2017/0258226 A1* | 9/2017 | Rowland | ............ | A47B 88/483 |

* cited by examiner

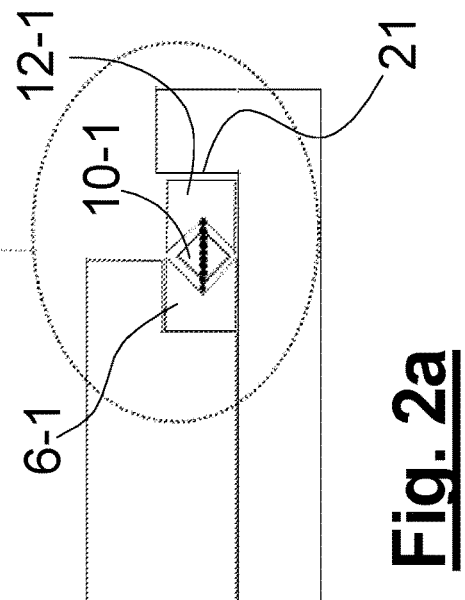
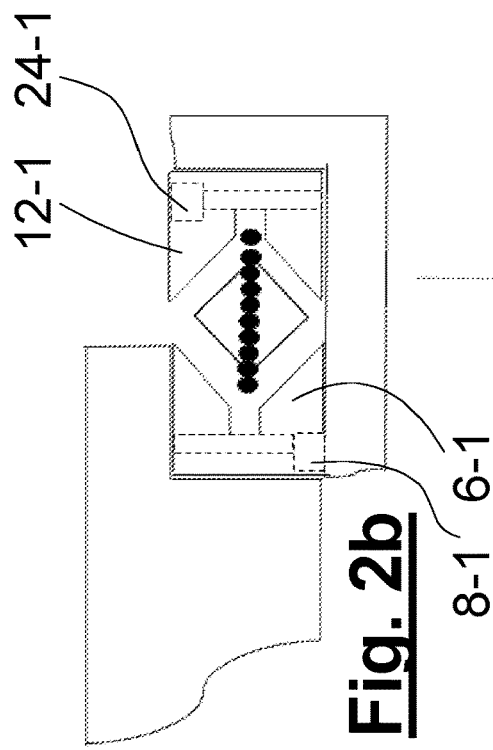
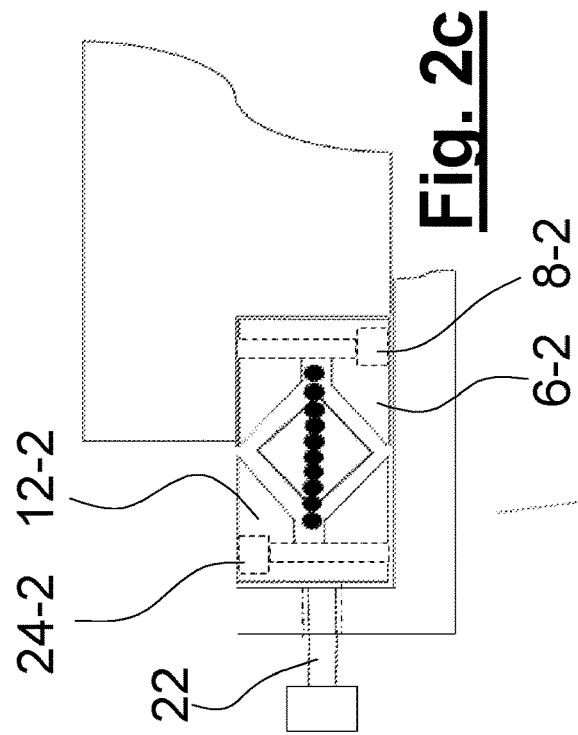

AUXILIARY ASSEMBLY DEVICE AND METHOD FOR PREMOUNTING A LINEAR GUIDE SYSTEM

CROSS-REFERENCE TO RELATED APPLICATION

This application claims the priority, under 35 U.S.C. § 119, of German Patent Application DE 10 2018 215 772.3, filed Sep. 17, 2018; the prior application is herewith incorporated by reference in its entirety.

BACKGROUND OF THE INVENTION

Field of the Invention

The present invention relates to an auxiliary assembly device for premounting a linear guide system on a top part, in which the linear guide system includes two linear guides having two respective mutually displaceable guide rails which have mutually facing raceways, and rolling elements disposed in a cage and located between the mutually facing raceways.

Linear guide systems are used to be able to displace two parts, for instance a top part and a bottom part, relative to each other. Such linear guide systems are formed of two linear guides having two respective mutually displaceable guide rails. The guide rails have mutually facing raceways, between which rolling elements disposed in a cage are disposed. In order to mount or exchange such a linear guide system, the guide rails must be placed against bearing surfaces of the top part and of the bottom part and are bolted down with defined torque. In order to adjust a length of travel of the linear guide system, the cages must be positioned midway, and in a non-destructive manner, between the respective guide rails.

In the process of the assembly, two guide rails, with a cage disposed therebetween, are firstly placed against a respective bearing surface of the top part and of the bottom part, pressed on and bolted with defined torque. Thereafter, a third guide rail is fastened to the top part. The last, fourth guide rail is loosely inserted and is only slightly tightened with fastening bolts. The cage, which is intended to be placed on this guide rail, can now be introduced with slight movements and be pushed up to its specific position. Since the fourth guide rail is only loosely inserted, there exists a gap through which the introduction of the cage is possible. It is only following this, that the fourth guide rail is pressed on with preload bolts in the direction of the cage, and thus the play is removed from the guide.

Such an assembly is very sensitive, however, and, in case of faulty execution, can result in destruction of the cage, tilting of the guide rails and cages, or dirtying of the linear guide system. For instance, this can result in destruction of a gearwheel which is connected to the cages in order to forcibly guide the cage.

SUMMARY OF THE INVENTION

It is accordingly an object of the invention to provide an auxiliary assembly device and a method for premounting a linear guide system, which overcome the hereinafore-mentioned disadvantages of the heretofore-known devices and methods of this general type and with which a simplified and improved assembly of a linear guide system is possible.

With the foregoing and other objects in view there is provided, in accordance with the invention, an auxiliary assembly device for premounting a linear guided system on a top part. The linear guide system comprises two linear guides having two respective mutually displaceable guide rails. The guide rails have mutually facing raceways and rolling elements disposed in a cage are located between the mutually facing raceways. In particular, the cage can be constituted by a forcibly guided cage, wherein in each guide rail pair at least one gearwheel is provided, connected to the cage and can engage in rack-like elements configured on the guide rails.

In order to enable a simple mounting of the linear guide system on the top part and, subsequently, in an associated bottom part, the auxiliary assembly device has an auxiliary rail. The auxiliary rail is configured for connection to the two linear guides and, in particular, to a respective narrow end of each linear guide, in order to hold the two linear guides with the top part in a preassembled state for insertion into the bottom part.

In this way, a simple mounting of the linear guide system on the top part is made possible and, in this preassembled state, it can be inserted into the bottom part. After the insertion of the preassembled linear guide system into the bottom part, the auxiliary rail can be removed again.

The auxiliary rail can be formed, for instance, of a metal plate.

According to one embodiment, the auxiliary rail has two positioning bolts for connecting the auxiliary rail to the guide rails which bear against the top part and are fastened to the same. Through the use of the positioning bolts, the auxiliary rail is fixed in its position. Thereafter, the cages can be disposed on both sides of the top part on the respective guide rail. The guide rails which do not bear directly against the top part, but rather, in the ready mounted state, are intended to bear against the bottom part, can then be fastened with auxiliary bolts to the auxiliary rail, so that the cages are respectively disposed between two guide rails.

In order to enable a particularly secure premounting of the linear guide system on the top part, the auxiliary assembly device can have two auxiliary rails. The first auxiliary rail is configured for connection to the narrow ends on one side of the two linear guides, and the second auxiliary rail is configured for connection to the opposite narrow ends of the two linear guides. In this way, at the two opposite ends of the linear guides, auxiliary rails are respectively disposed to enable a stable preassembly of the linear guide system, if they are respectively connected to each other.

In accordance with another object of the invention, there is provided a method for premounting a linear guide system on a top part. In a first step, the two linear guides, i.e. the two pairs of guide rails and the respectively intervening cages, are disposed on the top part. In a further step, a respective narrow end of the linear guides is fastened to an auxiliary rail.

After this premounting of the linear guide system on the top part with the aid of an auxiliary assembly device, the preassembled linear guide system can be inserted, together with the top part, into a bottom part. Thereafter, the linear guide system can be fastened in the bottom part, and the auxiliary assembly device can be removed. In this way, a simple installation of the linear guide system in the bottom part is made possible.

According to a further embodiment, the configuration of the two linear guides on the top part includes a fastening of the guide rails, bearing against the top part, to the top part, a configuration of the respective cage on these guide rails, and a configuration and fastening of the guide rails facing away from the top part. This means that firstly two guide rails are placed against the bearing surfaces of the top parts, pressed on, and bolted to the top part with defined torque. Thereafter, the two further guide rails are disposed beside the top part and the respective cage is loosely inserted. After this, the auxiliary assembly device is fastened to the two inner guide rails, which are fastened to the top part. The cages can now be positioned easily and in a non-destructive manner. In this context, in particular, one of the cages is firstly positioned and the two associated guide rails are connected to each other through the auxiliary rail of the auxiliary assembly device. This is now repeated with the cage and the guide rails of the other linear guide. Since the top part is now fixedly connected to the four guide rails, i.e. the two linear guides and their respective cage, the top part can be locally moved. A surveying or cleaning of the linear guide system, and the movement for installation into the bottom part, etc., can now be performed without the need for a further adjustment of the linear guide system.

According to a further embodiment, the fastening of the linear guide system in the bottom part includes a fastening of the guide rails facing away from the top part to the bottom part. In particular, firstly one of the guide rails is in this case fastened to the bottom part and, following this, the other guide rail is fastened to the bottom part. In particular, the preassembled linear guide system is in this case inserted into the bottom part, and firstly one of the guide rails is bolted to the bottom part with a defined torque. Thereafter, the second guide rail is likewise bolted with defined torque to the bottom part. Now the auxiliary assembly device can be removed, and the linear guide system is fixedly connected both to the top part and to the bottom part.

As a result of the proposed auxiliary assembly device, a simple handling of the linear guide system can be achieved, since the assembly is realized already prior to assembly of the top part with the bottom part. Since the linear guide system does not have to be installed by sliding or pivoting into the bottom part or into the top part, a possible dirtying of the linear guide system can likewise be prevented. Furthermore, as a result of the already realized preassembly of the linear guide system, a correct and midway positioning of the respective cage in the rails can be ensured, since these are put together independently of the bottom part.

Further advantages and advantageous embodiments are specified in the description, the drawings and the claims. In particular, those combinations of features which are specified in the description and in the drawings are purely exemplary, so that the features can also be present in isolation or in different combinations. Although the invention is illustrated and described herein as embodied in an auxiliary assembly device and a method for premounting a linear guide system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention shall be described in greater detail below with reference to illustrative embodiments represented in the drawings. The illustrative embodiments and the combinations shown in the illustrative embodiments are purely exemplary and are not intended to prescribe the scope of protection of the invention. This is defined solely by the appended claims. Other features which are considered as characteristic for the invention are set forth in the appended claims.

BRIEF DESCRIPTION OF THE SEVERAL VIEWS OF THE DRAWING

FIGS. 2a-2c are front-elevational views of the linear guide system of FIG. 1, which is installed in a top part and a bottom part.

DETAILED DESCRIPTION OF THE INVENTION

Figure 1:
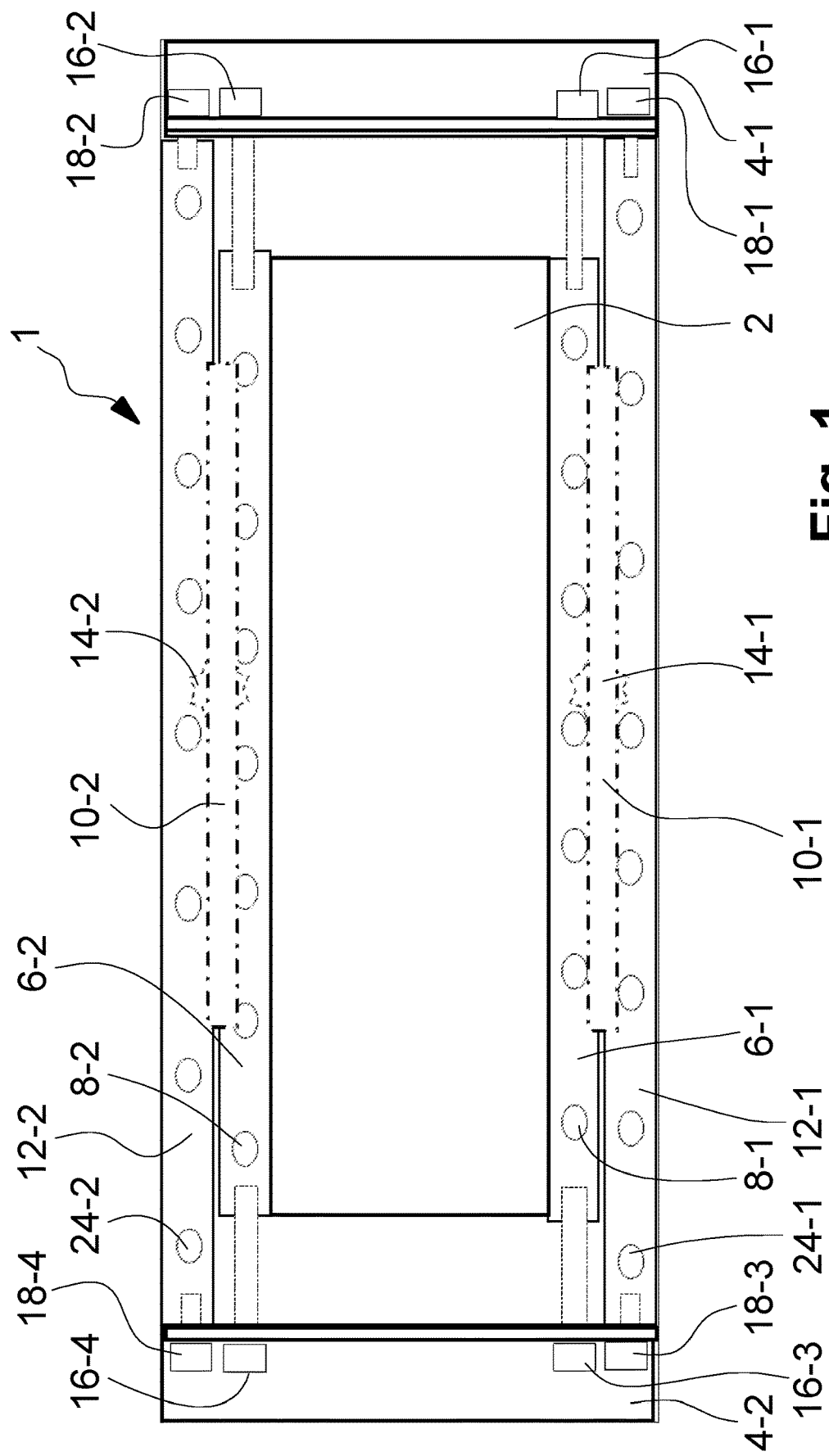
FIG. 1 is a diagrammatic, top-plan view of a linear guide system.

Referring now in detail to the figures of the drawings, in which the same or functionally equivalent elements are denoted with the same reference symbols, and first, particularly, to FIG. 1 thereof, there is seen a diagrammatic top view of a linear guide system 1, which is connected to a top part 2 and is held by an auxiliary assembly device formed of two auxiliary rails 4-1, 4-2. In order to premount the linear guide system 1 on the top part 2 before it is inserted into a bottom part, firstly two inner guide rails 6-1, 6-2 are disposed beside the top part 2. Through the use of fastening bolts 8-1, 8-2, the two guide rails 6-1, 6-2 are fastened to the top part 2 with a defined torque. Thereafter, cages 10-1, 10-2 are disposed on the guide rails.

Then two outer guide rails 12-1, 12-2 are likewise brought into position, so that the cages 10-1, 10-2 are disposed between the two guide rails 6-1, 6-2 and 12-1, 12-2. The outer guide rails 12-1, 12-2 and the cages 10-1, 10-2 at this point are only loosely disposed beside the guide rails 6-1, 6-2. Preferably, the individual elements are disposed side by side on a flat support.

The respective guide rail pairs 6-1, 12-1 and 6-2, 12-2 each have a respective gearwheel 14-1, 14-2. This serves to implement the respective cage 10-1, 10-2 as a forcibly guided cage.

If the outer guide rails 12-1, 12-2 are disposed in a likewise manner, the two auxiliary rails 4-1, 4-2 are attached to the narrow ends. Firstly, the two inner guide rails 6-1 and 6-2 are then fixedly connected by positioning bolts 16-1, 16-2, 16-3, 16-4 to the two auxiliary rails 4-1 and 4-2. Following this, the two outer guide rails 12-1, 12-2 and the cages 10-1, 10-2 are brought into their final position. Thereafter, the two outer guide rails 12-1, 12-2 are likewise connected through auxiliary bolts 18-1, 18-2, 18-3, 18-4 to the auxiliary rails 4-1 and 4-2. This preassembled linear guide system 1 can now be inserted, together with the already fastened top part 2, into a bottom part, as is described below with reference to FIGS. 2a to 2c.

FIG. 2a shows a front view of the assembled top part 2 with the guide rails 6-1, 6-2 and 12-1, 12-2 fastened thereto. The top part is inserted in the bottom part 20. FIGS. 2b and 2c respectively show the fastening of the guide rails 6-1, 12-1 (FIG. 2b) and 6-2, 12-2 (FIG. 2c) in an enlarged view.

After the insertion of the preassembled linear guide system 1 into the bottom part 20, the guide rail 12-1 is firstly disposed in the bottom part 20 against a stop face 21. Thereafter, the opposite guide rail 12-2 is secured by using a preload bolt 22, so that the entire linear guide system 1 is secured in the bottom part 20. Then the two outer guide rails 12-1 and 12-2 are respectively tightened on the bottom part 20 with a predefined torque by using fastening bolts 24-1 and 24-2. A further alignment of the cages 10-1, 10-2 and the guide rails 6-1, 6-2, 12-1, 12-2 is not necessary.

After the mounting of the linear guide system 1 on the bottom part 20, the auxiliary assembly device can be removed. This means that the positioning bolts 16-1, 162, 16-3, 16-4 and auxiliary bolts 18-1, 18-2, 18-3, 18-4 can be removed, and subsequently the auxiliary rails 4-1, 4-2 can likewise be removed.

As a result of the proposed auxiliary assembly device, a simple preassembly of a linear guide system with a top part is possible, whereby, in particular, a simple installation of the cages of the linear guide system is possible. A pivoting or tilting of the guide rails or clamping of the guide rails at the final installation site can thus be eliminated, which prevents damage to the linear guide system.

The following is a summary list of reference numerals and the corresponding structure used in the above description of the invention:

1 linear guide system
2 top part
4 auxiliary rail
6 inner guide rail
8 fastening bolt
10 cage
12 outer guide rail
14 gearwheel
16 positioning bolt
18 auxiliary bolt
20 bottom part
21 stop face
22 preload bolt
24 fastening bolt

The invention claimed is:

1. An auxiliary assembly device for premounting a linear guide system on a top part,
the linear guide system including two linear guides each having narrow ends and two respective mutually displaceable guide rails with mutually facing raceways, a cage, and rolling elements disposed in said cage between said raceways; and
the auxiliary assembly device comprising an auxiliary rail configured for connection to said respective narrow ends of the two linear guides for holding the two mutually displaceable guide rails of each of the two linear guides with the top part in a premounted state for insertion into a bottom part.

2. The auxiliary assembly device according to claim 1, wherein the auxiliary rail has two positioning bolts for fastening the guide rails bearing against the top part.

3. The auxiliary assembly device according to claim 1, wherein:
the narrow ends of the two linear guides are first narrow ends;
the two linear guides have second narrow ends opposite the first narrow ends;
the auxiliary rail is one of first and second auxiliary rails;
the first auxiliary rail is configured for connection to the first narrow ends of the two linear guides; and
the second auxiliary rail is configured for connection to the opposite second narrow ends of the two linear guides.

4. A method for premounting a linear guide system on a top part, the method comprising the following steps:
providing a linear guide system including two linear guides each having two respective mutually displaceable guide rails with mutually facing raceways;
placing rolling elements in a cage between the mutually facing raceways;
placing the two linear guides on the top part; and
fastening a respective narrow ends of the two mutually displaceable guide rails of each of the two linear guides to an auxiliary rail of an auxiliary assembly device.

5. The method according to claim 4, which further comprises:
inserting the preassembled linear guide system with the top part into a bottom part;
fastening the linear guide system in the bottom part; and
removing the auxiliary assembly device.

6. The method according to claim 5, which further comprises carrying out the fastening of the linear guide system in the bottom part by fastening the guide rails facing away from the top part to the bottom part.

7. The method according to claim 6, which further comprises fastening the two guide rails facing away from the top part to the bottom part.

8. The method according to claim 5, which further comprises carrying out the step of placing the two linear guides on the top part by fastening the guide rails bearing against the top part to the top part, placing the respective cage on the guide rails, and placing and fastening the guide rails facing away from the top part.

* * * * *